US 9,284,854 B2

(12) United States Patent
Guyomarc'h et al.

(10) Patent No.: US 9,284,854 B2
(45) Date of Patent: Mar. 15, 2016

(54) METHOD AND SYSTEM FOR PRODUCING A SOURCE OF THERMODYNAMIC ENERGY BY CO2 CONVERSION FROM CARBON-CONTAINING RAW MATERIALS

(75) Inventors: Raymond François Guyomarc'h, Caussade (FR); Ammar Bensakhria, Thourotte (FR)

(73) Assignee: SEE—Soluções, Energia e Meio Ambiente Ltda., São Paulo-SP (BR)

( * ) Notice: Subject to any disclaimer, the term of this patent is extended or adjusted under 35 U.S.C. 154(b) by 701 days.

(21) Appl. No.: 13/576,640

(22) PCT Filed: Aug. 8, 2010

(86) PCT No.: PCT/BR2010/000339
§ 371 (c)(1),
(2), (4) Date: Aug. 1, 2012

(87) PCT Pub. No.: WO2011/091489
PCT Pub. Date: Aug. 4, 2011

(65) Prior Publication Data
US 2012/0299302 A1    Nov. 29, 2012

(30) Foreign Application Priority Data
Feb. 1, 2010    (FR) ...................................... 10 00377

(51) Int. Cl.
*C01B 3/36*     (2006.01)
*F01K 13/00*    (2006.01)
*C10J 3/22*     (2006.01)

(52) U.S. Cl.
CPC . *F01K 13/00* (2013.01); *C10J 3/22* (2013.01); *C10J 2300/092* (2013.01);
(Continued)

(58) Field of Classification Search
CPC ................................................ C10J 2300/1671
See application file for complete search history.

(56) References Cited

U.S. PATENT DOCUMENTS

| 1,163,922 A | 12/1915 | Hillhouse |
| 2,128,262 A | 8/1938 | Newman |

(Continued)

FOREIGN PATENT DOCUMENTS

| EP | 1 136 542 A1 | 9/2001 |
| EP | 1 933 087 A2 | 6/2008 |

(Continued)

OTHER PUBLICATIONS

Kong et al., "Hydrogen Production from Biomass Wastes by Hydrothermal Gasification," Energy Sources, Part A, 30:1166-1178, 2008.

(Continued)

*Primary Examiner* — Imran Akram
(74) *Attorney, Agent, or Firm* — Volpe and Koenig, P.C.

(57) ABSTRACT

The invention constitutes a process and system to generate electricity from the conversion of $CO_2$ over carbon-containing raw material. It comprises steps of gasification of the raw material containing carbon by means of a gaseous flow essentially containing $CO_2$, wherein the oxidation of the gaseous flow obtained after the gasification by oxygen holders and the oxidation of deactivated oxygen holders as obtained. The process allows to give value to the global energy as generated by the set of these steps to feed an electricity generating system, such as a turboalternator. The invention also corresponds to a system to perform such a process.

10 Claims, 2 Drawing Sheets

Figure 1:
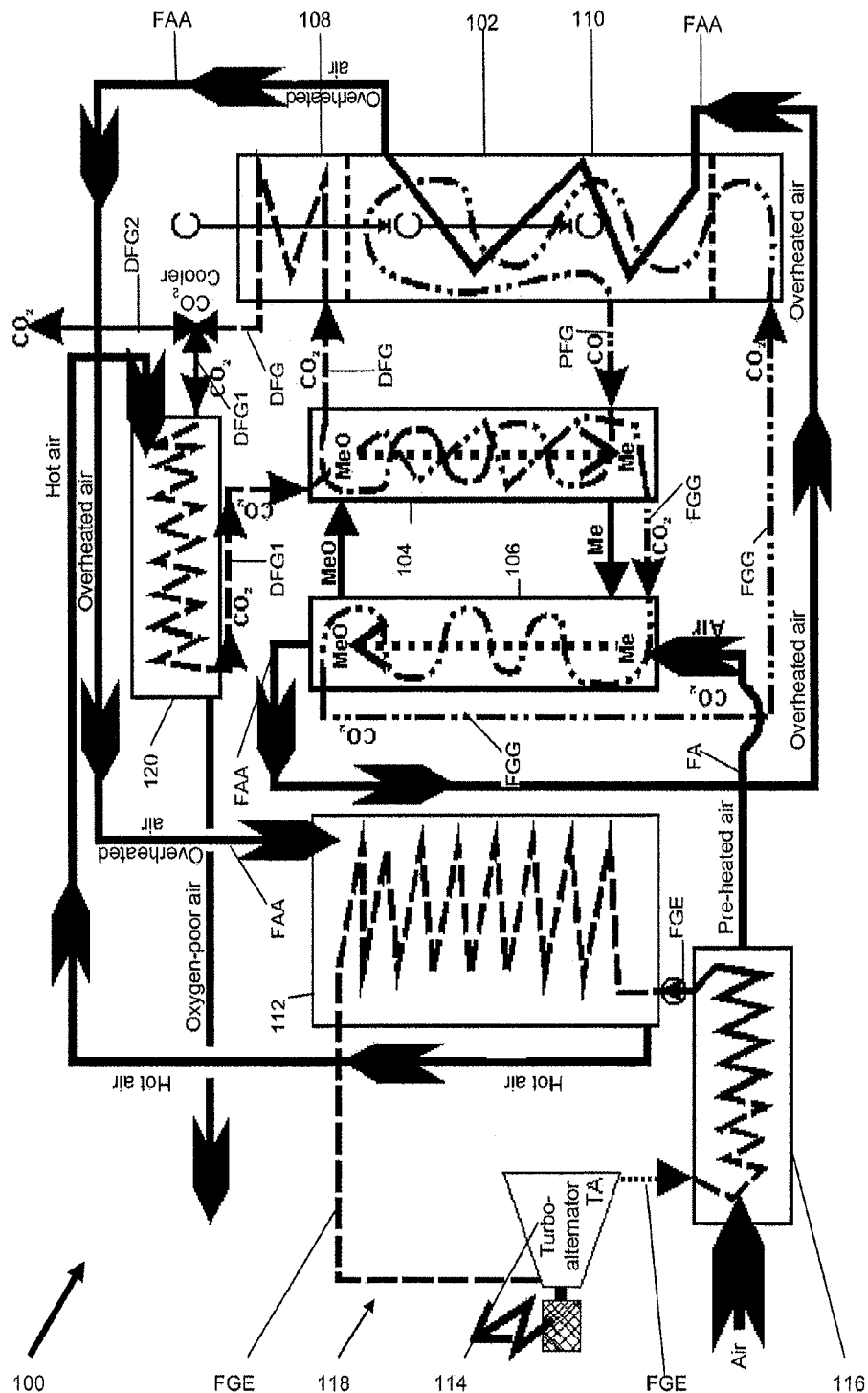

(52) U.S. Cl.
CPC . *C10J 2300/0916* (2013.01); *C10J 2300/0946* (2013.01); *C10J 2300/0969* (2013.01); *C10J 2300/1603* (2013.01); *C10J 2300/1681* (2013.01); *C10J 2300/1807* (2013.01); *C10J 2300/1815* (2013.01); *F23C 2900/99008* (2013.01); *F23C 2900/99011* (2013.01); *Y02E 20/12* (2013.01); *Y02E 20/346* (2013.01); *Y02P 20/129* (2015.11)

(56) References Cited

U.S. PATENT DOCUMENTS

| | | | |
|---|---|---|---|
| 2,602,809 | A | 7/1952 | Dickinson |
| 2,656,255 | A | 10/1953 | Johnson |
| 2,772,954 | A | 12/1956 | Jéquier |
| 2,864,688 | A | 12/1958 | Reed |
| 3,031,287 | A | 4/1962 | Benson et al. |
| 3,201,215 | A | 8/1965 | Negra et al. |
| 3,442,620 | A | 5/1969 | Huebler et al. |
| 3,915,840 | A * | 10/1975 | Gladrow ............. C10G 35/14 208/133 |
| 4,040,976 | A | 8/1977 | Greene |
| 4,070,160 | A * | 1/1978 | Cottle ................. C10J 3/06 252/373 |
| 4,265,868 | A * | 5/1981 | Kamody ............... C01B 3/34 252/373 |
| 4,272,555 | A | 6/1981 | Davis et al. |
| 4,343,624 | A | 8/1982 | Belke et al. |
| 4,382,915 | A * | 5/1983 | Sadhukhan ........... C10J 3/466 423/418.2 |
| 4,725,381 | A | 2/1988 | Pinto |
| 5,213,587 | A * | 5/1993 | Ekstrom ............... C10J 3/84 423/230 |
| 6,444,179 | B1 | 9/2002 | Sederquist |
| 6,648,949 | B1 | 11/2003 | Der et al. |
| 7,494,574 | B2 | 2/2009 | Kong et al. |
| 7,780,749 | B2 | 8/2010 | Kulkarni et al. |
| 2002/0127178 | A1 | 9/2002 | Kindig et al. |
| 2004/0009378 | A1 | 1/2004 | Lightner |
| 2004/0123601 | A1 | 7/2004 | Fan |
| 2005/0175533 | A1 | 8/2005 | Thomas et al. |
| 2006/0130401 | A1 * | 6/2006 | Giglio ................. B01J 20/20 48/197 R |
| 2008/0078122 | A1 | 4/2008 | Clark |
| 2008/0134579 | A1 | 6/2008 | Kulkarni et al. |
| 2008/0184621 | A1 | 8/2008 | Clark |
| 2009/0049748 | A1 | 2/2009 | Day et al. |
| 2009/0126271 | A1 * | 5/2009 | Kyo et al. .................. 48/77 |
| 2009/0148927 | A1 | 6/2009 | Schroeder et al. |
| 2009/0211444 | A1 * | 8/2009 | Lissianski ............. B01D 53/02 95/107 |
| 2010/0132633 | A1 | 6/2010 | Liu et al. |
| 2010/0293845 | A1 * | 11/2010 | Zeman ................ C07C 29/1518 44/451 |
| 2011/0303875 | A1 * | 12/2011 | Hoteit ..................... C01B 3/42 252/373 |
| 2012/0171588 | A1 | 7/2012 | Fan et al. |

FOREIGN PATENT DOCUMENTS

| | | |
|---|---|---|
| GB | 521415 | 5/1940 |
| GB | 757333 | 9/1956 |
| GB | 2 125 430 A | 3/1984 |
| JP | H06 319520 A | 11/1994 |
| JP | H10 259384 A | 9/1998 |
| JP | 2002 173301 A | 6/2002 |
| JP | 2006 008872 A | 1/2006 |
| JP | 2009 242248 A | 10/2009 |
| WO | 01/68789 A1 | 9/2001 |
| WO | 0168789 | 9/2001 |
| WO | 2004/067933 A2 | 8/2004 |
| WO | 2005/003632 A1 | 1/2005 |
| WO | 2007/082089 A2 | 7/2007 |
| WO | 2008/036902 A2 | 3/2008 |
| WO | 2008/097691 A1 | 8/2008 |
| WO | 2009/055829 A1 | 4/2009 |

OTHER PUBLICATIONS

Patterson, deceased, "A French-English Dictionary for Chemists," Second Edition (copyright 1954).

Mimori et al., "A New Reversible Chemical System for Efficient Utilization of Carbonaceous Compounds," Energy vol. 19, No. 7, pp. 771-778, 1994.

Rezvani et al., "Comparative assessment of coal fired IGCC systems with CO2 capture using physical absorption, membrane reactors and chemical looping," Fuel 88 (2009) 2463-2472.

Li et al., "Clean coal conversion processes—progress and challenges," Energy & Environmental Science, 2008, 1, 248-267.

Centi et al., "Opportunities and prospects in the chemical recycling of carbon dioxide to fuels," Catalysis Today, 148 (2009) 191-205.

* cited by examiner

METHOD AND SYSTEM FOR PRODUCING A SOURCE OF THERMODYNAMIC ENERGY BY CO2 CONVERSION FROM CARBON-CONTAINING RAW MATERIALS

This application is a 35 U.S.C. §371 national phase application of PCT/BR2010/000339, which was filed Aug. 8, 2010 and is incorporated herein by reference as if fully set forth.

The invention refers to a process to produce convertible thermodynamic power (into electricity, etc.) from raw material containing carbon. It also refers to a system to perform such a process.

The field of the invention is the production of electricity from raw material containing carbon and, more particularly, from coal and/or dry biomass.

The production of electricity by double generation (co-generation) from thermal power as obtained by burning fuel raw material containing carbon is a process which is very well-known by the experts in the art.

This process consists, in its most generic version, in using the heat of biomass combustion to heat a fluid which is then used in a system for co-generation of electricity, such as a turbo alternator.

However, the processes and systems to generate electricity from carbon raw materials inconveniently need to perform the combustion of the material, so to transfer as much power potential produced by said combustion as possible. In all combustions, there is a yielding corollary: the yielding of the combustion as related to the quality and grade of humidity of said carbon material and the global thermal yielding relative to the thermal generator, its configuration, its combustion yielding (and consequently the incidence of incrustation (deposit of non-burnt material) caused by more or less complete combustion, reducing progressively and rather quickly the yielding of the thermal exchange of the thermal generator).

In existing systems, the most widely used method for combustion is performed under oxidizing atmosphere, i.e. wherein the fuel of said raw material containing carbon is surrounding air. Global yielding of said thermal generators is approximately 85% PCI (lower heating power) of the carbon-containing material as used, wherein maintenance requirements are relative to the quality and humidity rate of said carbon raw material.

The systems of this kind generate a combustion gas (smokes) more or less loaded with dusts, COV (volatile organic compounds), NOx, complex pollutant molecules (methane, carbon monoxide, dioxins, PCB, etc.) and the $CO_2$ relative to the combustion of carbon as contained in said raw material containing carbon. At least 15% of PCI of said carbon raw material are dispersed through smokes and incombustible products. PCI of said carbon raw material varies, when referring to vegetal and/or animal biomass, between 2 and 5.2 kWh/kg as a function of its relative humidity (i. e. transferred global thermal yielding between 1.7 and 4.4 kWh/kg); or when referring to fossil carbon: between 6 and 8 kWh/kg as a function of its carbon concentration (i.e. transferred global thermal yielding between 5.1 and 6.8 kWh/kg). $CO_2$ rate as contained in smokes of the current systems is between 10 and 18% per $Nm^3$ of smokes and its concentration for eventual stocking and/or sequestration needs complex and expensive processes.

In the past few years, new systems and processes were put into practice to optimize the yielding of combustion and $CO_2$ concentrations in smokes: it mainly refers to oxidizing agents enriched with oxygen, up to pure oxycombustion systems. These systems and processes considerably increase global thermal yielding and smokes are less harmful to the environment, since they are essentially composed of $CO_2$, which can be easily captured. However, these systems and processes depend on a continued supply of oxygen, and therefore its production is expensive and not free from impact to the environment.

An object of the present invention is to avoid the inconveniences as mentioned above.

Another object of the present invention is to offer a process and a system for the production of electricity from biomass containing carbon. Whether the mentioned carbon biomass is fossil or not (carbon and/or plant and/or animal biomass and/or residues/garbage) containing enough carbon for its exploration, it can contain molecular hydrogen. Under this condition, reactions as disclosed below are identical, just varying the final results as related to the molar mass difference between carbon and hydrogen (1 mol of C=12 g, 1 mol of $H_2$=2.016 g). The oxidation of that hydrogen in the reaction chain produces water steam which will be condensed and recovered in said reaction chain as disclosed below, as well as the resulting intrinsic heat. Whether the carbon-containing raw material contains hydrogen or not does not have essential influence over the object of the invention: the production of electricity, or over its yielding. The present disclosure of the invention therefore considers a material essentially composed by carbon (fossil coal, vegetal coal, coal from the pyrolysis of organic biomass, etc.), not however excluding plant and/or animal biomass and/or carbon residues, which should be conditioned and dry. The preparation of carbon materials as mentioned consists in crushing/milling (which optimizes the yielding of pyrolytic reactions) and drying, if necessary.

The invention allows to reach the above mentioned objects by means of a process to produce electricity from carbon raw material (MPC) and, more particularly, from carbon biomass (BC), which process comprises at least an iteration of the following steps, constituting a treatment cycle:

gasification in a first so-called gasification reactor of carbon-containing raw material with a gaseous flow of gasification containing $CO_2$ at high temperature, said gasification supplying a first gaseous flow essentially containing molecules of carbon monoxide (CO);

oxidation in a second so-called "oxidation" reactor by said oxygen holders in oxidized state, said molecules of carbon monoxide (CO) being present in said first gaseous flow, said oxidation supplying a second gaseous flow at high temperature containing $CO_2$ and oxygen holders in reduced state (Me);

activation, in a third so-called "activation" reactor, of said oxygen holders in reduced state with a so-called gaseous flow of "activation" containing elements of oxygen, wherein said oxidation supplies oxygen holders in oxide state and an oxygen-poor gaseous flow of activation at high temperature;

conversion into electricity of at least a part of the thermal power of said oxygen-poor gaseous flow of activation at high temperature, e.g. by a steam generator/thermal exchanger system and a turbo alternator, to convert steam into electricity.

The process of the invention allows to give value to the energy from the raw material containing carbon with higher yielding than current processes and systems.

Oxygen holders may contain NiO, $Fe_2O_3$, MgO, CaO, etc.

The process of the invention allows to generate electricity from raw material containing carbon, not performing combustion of the biomass. In fact, the energy as contained in the biomass is recovered thanks to biomass gasification, a gaseous $CO_2$ flow (thermochemical reaction converting the $CO_2$ molecule over an element of carbon into two molecules of carbon monoxide CO).

The process of the invention may include, before the value-giving step, the transference of a part of the thermal power as generated during the gasification to the oxygen-poor gaseous flow of activation.

Therefore, the gaseous flow of activation is pre-heated thanks to the thermal power by the process of the invention from MPC, i.e. with no supply of external energy.

Advantageously, the process of giving value to the thermal power of the oxygen-poor gaseous flow of activation under high temperature may additionally comprise a step of transference of at least one part of the thermal power from said oxygen-poor gaseous flow of activation to a so-called electricity generating fluid, supplied to a converter device for the production of electricity.

On the other hand, the process of the invention may comprise the recovery of the residual thermal power from said oxygen-poor gaseous flow of activation, wherein at least a part of said residual thermal power is sent to the gaseous flow of gasification as used in the following treatment cycle.

Therefore, the process of the invention allows to grant value to the residual energy to pre-heat the gaseous flow of gasification, thus avoiding to use external power supply.

The process of the invention may advantageously comprise a step of increasing the temperature of the raw material containing carbon before gasification by means of the transference of at least a part of the thermal power of the second gaseous flow under high temperature to said raw material.

The thermal power of that second gaseous flow is therefore equally valued in the process of the invention.

The process of the invention may additionally comprise recycling in closed circuit (loop) of at least a part of the $CO_2$ in the second gaseous flow to constitute said gaseous flow of gasification.

The process of the invention allows to recycle a part of that $CO_2$ flow to a new treatment cycle. Therefore, the impact of the process of the invention over the environment is limited.

Advantageously, the procedure of the invention may comprise, before the step of activation of oxygen holders, pre-heating of the gaseous flow of activation with the residual energy of the electricity generating fluid.

According to a specific version of the process of the invention, it can advantageously comprise the supply of a part of the second gaseous flow to a bioreactor containing microalgae. After refrigeration of the mentioned part of said second gaseous flow, said microalgae photosynthesize the $CO_2$ as present in the mentioned part of said second gaseous flow, supplying said bioreactor with, on one side, a gaseous flow of oxygen, and, on the other side, biomass containing carbon.

In this version, the process of the invention does not bring in any impact over the environment. On the other hand, in this specific version, the process of the invention produces at least a part of the raw material containing carbon, gasified in the system.

Still in this version of the process of the invention, a gaseous flow of oxygen is generated by microalgae. That gaseous flow of oxygen may receive value in the process of the invention, e.g. to generate electricity or thermal power for any of the steps of the process of the invention.

As an example, the process of the invention may comprise the recovery of at least a part of the flow of oxygen as generated by microalgae and an injection of at least a part of said flow of oxygen in the gasification reactor to complete the gasification of raw material containing carbon.

On the other hand, the process of the invention may comprise the recovery and a treatment of the biomass containing carbon as supplied by the bioreactor, due to the gasification of said biomass in the gasification reactor.

Another object of the invention proposes a system to produce electricity from raw material containing carbon, comprising:
 a gasification reactor of carbon-containing raw material with a gaseous flow of gasification containing $CO_2$ at high temperature, said reactor supplying a first gaseous flow containing molecules of carbon monoxide (CO);
 an oxidation reactor by oxygen holders in oxide state, being said molecules of carbon monoxide (CO) present in the first gaseous flow, wherein the reactor supplies a second gaseous flow under high temperature containing $CO_2$ and oxygen holders in reduced state;
 an activation reactor of said holders of oxygen in reduced state with a gaseous flow comprising elements of oxygen, said reactor supplying holders of oxygen in oxidized state and an excess of thermal power;
 an electricity generation device from at least one part of said thermal exceeds from said activation.

The system of the invention may advantageously comprise mechanical means of transportation of the oxygen holders from the oxidation reactor to the activation reactor and/or from the activation reactor to the oxidation reactor.

On the other hand, the system of the invention may comprise a loop recycling circuit of a part of the $CO_2$ as present in the second gaseous flow as used as a gaseous flow of gasification.

The electricity generation device may comprise a turbo alternator or any equivalent device.

Advantageously, the system of the invention may comprise a bioreactor containing microalgae to which a part of the $CO_2$ as present in the second gaseous flow, wherein said microalgae photosynthesize said $CO_2$ and said reactor supplies, on one hand, a gaseous flow of oxygen and, on the other hand, biomass containing carbon.

Figure 2:
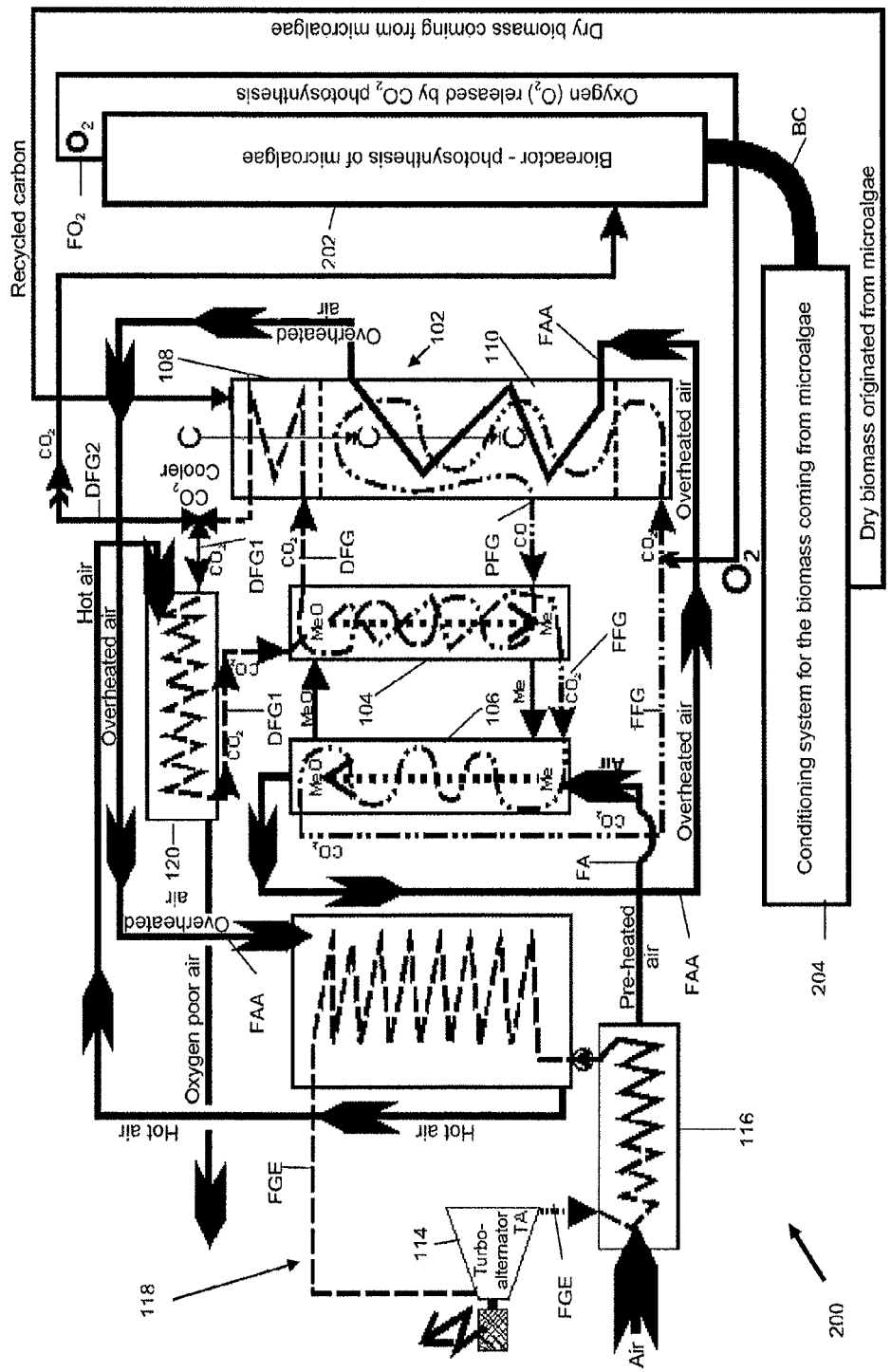

Other advantages and characteristics will appear from the analysis of the detailed description of a non-limitative way of embodiment and the attached figures:

FIG. 1 is a schematic representation of a first way of embodiment of a system of the invention; and FIG. 2 is a schematic representation of a second way of embodiment of a system of the invention.

In the figures, the elements appearing in all of them receive the same reference.

FIG. 1 is a schematic representation of a first way of embodiment of the system of the invention.

The system 100 comprises a gasification reactor 102, an oxidation reactor 104 and an activation reactor for oxygen holders 106.

The gasification reactor is composed of two communicating and concomitant parts:
 a feeding chamber (sas) 108 for dried carbon-containing materials, comprising a mechanized feeding valve (not shown) under control of $CO_2$ to avoid any entrance of air and guarantee the hermeticity of the system; and
 a $CO_2$ converter 110 over the raw material containing carbon as properly stated.

In the feeding chamber 108, dry materials containing carbon indicated as C in the figures are pre-heated by contact, convection and osmosis by a hot gaseous flow of $CO_2$. We will see further below that this gaseous flow of $CO_2$ is produced and pre-heated by the system 100. This gaseous flow of $CO_2$ crosses dry materials containing carbon C, transferring to them their thermal capacity. In the course of its introduction in this sector, through a mechanized feeding valve, which air hermeticity is assured by the $CO_2$ as injected under pressure, the materials containing carbon absorb the sensible heat of $CO_2$. Said raw materials containing carbon are introduced by given sequences.

Dry raw materials containing carbon C subsequently flow by gravity in the converter 110 by means of tubular grids (not shown) reducing their speed.

A gaseous flow of gasification FGG essentially composed by reactive $CO_2$ under high temperature is introduced in the gasification reactor 102. The reactive $CO_2$ is at a temperature of 900/1000° C. or higher. It is injected into the gasification reactor in counter current from the flow of materials containing carbon C, after circulation in the tubes of deceleration grids. Said tubular grids perform the role of a heat exchanger with materials containing carbon, adding large thermal complementation, useful to conversion, with a role of flow retardant for the raw materials in the gasification reactor.

$CO_2$ as introduced finds the dry material containing carbon C which, in this step, reached a temperature near 900/1000° C. The reaction of the meeting is the conversion of $CO_2$ into CO, and therefore in power. This energy fully transfers the power potential of materials containing carbon C to the following reactive sectors in the system 100.

The conversion reactor (I) from $CO_2$ to CO is endothermal, according to the reactions:

$$CO_2 - \tfrac{1}{2}O_2 = CO + O + 283 \text{ kJ/mol}$$

$$C + \tfrac{1}{2}O_2 \text{(from } CO_2\text{)} = CO - 111 \text{ kJ/mol}$$

Consider a thermal deficit of 172 kJ/mol of $CO_2$ converted in CO by C. Each of the two molecules of CO as obtained has a heating power of 283 kJ/mol, i.e. a total 566 kJ, while the heating power of C (material containing carbon with primary reaction energy) is 394 kJ/mol. Under these conditions, the main object is, therefore, to supply 172 kJ from the conversion reaction by means not imputable to this power potential or by external thermal means by introducing another power to compromise such yielding. We will see in the disclosure below how the system of the invention reaches this object.

In the outlet of the gasification reactor 102, a first gaseous flow PFG essentially comprising CO at a temperature of more than 900° C. This first gaseous flow PFG is therefore eminently full of power and reactive. It allows the transference of the potential energy of raw materials containing carbon to the oxidation reactor 104. Therefore, it is introduced in the oxidation reactor 104, wherein it will be oxidized in contact with oxygen-holding materials MeO in oxidized or active state.

The active oxygen holders MeO are introduced in the oxidation reactor 104 at the level of an upper part of that reactor 104 and flow through tubular grids (not shown) decelerating this flow.

The first gaseous flow coming from the gasification reactor 102 essentially comprising CO is at a temperature of more than 900° C. It is introduced in the oxidation reactor 104 at the level of a lower part of that reactor 104 in counter current to the flow of oxygen holders MeO. The meeting between oxygen holders in oxide state MeO (or active) and the first gaseous flow causes:

- the oxidation of molecules of carbon monoxide CO into carbon dioxide $CO_2$; this reaction is exothermal and releases 283 kJ/mol; and
- the reduction of active oxygen holders MeO; this reaction is endothermal and absorbs 244.3 kJ/mol.

Therefore, the global reaction (II) is exothermal:

$$2MeO - 2\tfrac{1}{2}O_2 + 2CO + 2\tfrac{1}{2}O_2 = 2CO_2 + 2Me$$

$$+488.60 \text{ kJ} - 566 \text{ kJ} = -77.4 \text{ kJ}$$

The oxidation reactor 104 is therefore exothermal for 77.4 kJ by molar equivalent of $CO_2$, which will be deducted from the 172 kJ to be supplied to the reaction occurring inside the gasification reactor 102 as per reaction II as disclosed above.

Said oxidation reactor supplies a second gaseous flow DFG essentially comprising $CO_2$ at high temperature and oxygen holders Me in reduced state (deactivated).

The oxidation reactor 104 is kept at a correct temperature level (1000° C. or lower) thanks to the second gaseous flow DFG1 (part of the second gaseous flow DFG as recycled, after said second flow DFG changed its thermal capacity along the various thermal exchanges refrigerating it at the outlet of said oxidation reactor 104), regulating the temperature of said oxidation reactor 104, picking up the thermal excess in benefit of its useful thermal capacity to new iteration.

Said second gaseous flow DFG exiting from the oxidation reactor 104 goes through the feeding chamber 108 of dry materials containing carbon. Therefore, this second gaseous flow DFG is used to pre-heat the dry raw material containing carbon C, exchanging its sensitive heat (by contact, convection or osmosis) with said dry raw material C.

At the outlet of the feeding chamber 108, the second gaseous flow DFG is refrigerated at the admission temperature of the dry raw material containing carbon C at which its essential thermal capacity has been transferred. It is extracted from that chamber 108 by mechanical means (extractors/fans, not shown) keeping the whole system under depression.

Oxygen holders Me in reduced state are introduced into the activation reactor 106. The transference of oxygen holders from the oxidation reactor 104 to the activation reactor 106 is performed by mechanical means or by gravity, as per reactor configuration.

Deactivated oxygen holders Me are still at high temperature of about 800° C. and are eminently reactive. They flow to the activation reactor 106 by gravity by means of the tubular grid net (not shown) decelerating such flow. Tubular nets perform the role of a thermal exchanger, wherein the gaseous flow DFG1 circulates (a part of the second gaseous flow DFG as recycled, wherein it acquires is thermal capacity of gaseous flow of gasification FGG.

In the reactor 106, Me are reactivated by the oxygen of a gaseous flow of activation FA, which, in the present example, is from atmospheric air surrounding the counter current.

The oxidation of oxygen holders Me in contact with air is exothermal, the power supplied is 244.30 kJ/mol of Me, i.e. 488.60 kJ for both moles of Ni according to the reference option of oxygen holders in the disclosure of chain reaction.

This reactor supplies at the outlet a very hot oxygen-poor gaseous flow of activation FAA at temperatures of 1100° C. or lower and activated oxygen holders MeO at the same temperature.

The reacted oxygen holders in MeO are transferred to the oxidation reactor 104 by mechanical means or by gravity, as per reactor configuration.

The very hot oxygen-poor gaseous flow of activation FAA as obtained at the outlet of the activation reactor 106 is directed through an exchanger 112 through a gasification reactor 102 to a tubular net performing the role of exchanger and deaccelleration grids in said gasification reactor 102. This trajectory allows to keep the high temperature useful to the conversion reaction of $CO_2$ over C, not overloading the thermal capacity of the over-heated oxygen-poor gaseous flow FAA.

In the outlet of the gasification reactor 102, the over-heated oxygen-poor gaseous flow FAA is transferred in the exchanger 112, wherein it exchanges the essential part of its heat with an electricity generation fluid FGE.

Said electricity generation fluid is then supplied to a turboalternator 114 wherein the thermal power is transformed in electricity.

In the outlet of turboalternator 114, the electricity generating fluid FGE contains residual thermal power. In the outlet of the turboalternator 114, that fluid FGE is injected in another thermal exchanger 116 wherein the residual energy of the electricity generating fluid FGE is transferred to the gaseous flow of activation FA which will be used in a subsequent cycle of treatment to activate oxygen holders in the activation reactor 106. Therefore, the gaseous flow of activation FA as used in the subsequent cycle of treatment is pre-heated thanks to the thermal power as supplied directly by the system of the invention, not requiring an external power supply.

At the outlet of that second exchanger, the electricity generating fluid FGE is again injected in the first thermal exchanger 112 to start a new cycle.

Therefore, the electricity generating fluid FGE circulates in a closed circuit 118 interconnecting the first thermal exchanger 112, the turboalternator 114 and the second thermal exchanger 116.

A part DFG1 of the second cooled gaseous flow DFG extracted from the feeding chamber 108 of the gasification reactor is recycled and used as a gaseous flow of gasification for the following cycle. The other part DFG2 of the second gaseous flow is stocked or rejected in the atmosphere.

However, this flow DFG1 is cold and should be heated for use as a gaseous flow of gasification.

The oxygen-poor gaseous flow FAA exiting from the first thermal exchanger 112 after having transferred most of its thermal power with the electricity generating fluid FGE contains residual energy which is transferred to the gaseous flow DFG1 in a thermal exchanger 120.

This flow DFG1 subsequently travels in the tubular net (performing the role of tubular grids for deceleration of the flow of MeO and thermal exchanger) located in the oxidation reactor 104 to obtain a part of its thermal capacity and, at the same time, regulate the temperature of the oxidation reactor 104 at values of less than 1000° C. Thanks to this transference of a part of the thermal power from the oxidation reactor 104, the second gaseous flow DFG transfers a part of its thermal capacity before its introduction in the feeding chamber 108 of the gasification reactor 102. Therefore, at the outlet of said oxidation reactor 104, a gaseous gasification flow FGG composed by the recycled part DFG1 of the second gaseous flow DFG, is obtained. The gaseous flow of gasification FGG as obtained at the outlet of the oxidation reactor 104 is then injected in the net of tubular grids (which perform the role of a thermal exchanger) of the activation reactor 106. It then acquires the whole working capacity for $CO_2$ conversion over the materials containing carbon, always keeping the temperature of the activation reactor below 1000° C., absorbing the released excess of energy. At the outlet of the activation reactor 106, the gaseous flow of gasification FGG as obtained is injected in the converter 110 to perform the following cycle.

The second gaseous flow DFG essentially comprising $CO_2$ as generated by the oxidation reaction in the oxidation reactor 104 is composed by 2 moles which thermal capacity is 101.331 kJ, to which 77.40 kJ from the exothermal power of the reaction should be added, i.e.: 178.731 kJ to which we should exclude Cp (thermal capacity of coal at 1000° C.) of the coal at 1000° C. and Cp of the mole of $CO_2$ from recycled gasification and the conversion power, i.e.:

thermal capacity of the carbon at 1000° C.-14 kJ/mole (1 mole of C per 1 mole of $CO_2$); and enthalpy of the mole of $CO_2$ from recycled gasification=50.67 kJ/mole Conversion energy=172 kJ/mole of $CO_2$, i.e. a total:

14+50.67+172 kJ–236.67 kJ per mole of converted $CO_2$ by one mole of carbon (energy required to gasification).

In this step of recovery of the process energies, the thermal deficit is reduced to: 178.731 kJ–236.67=57.939 kJ per mole of converted $CO_2$ by 1 mole of carbon. That thermal deficit of 57.939 kJ per mole of $CO_2$ is taken off the thermal power as supplied to the activation reactor 106 before the production process of thermodynamic energy and its conversion to electricity.

The thermal power of 236.67 per mole of converted $CO_2$, as consumed by the set of reactions, should be supplied at the start of the system. Then, the system is thermally autonomous, with the exception of the carbon supply.

In fact, as we have just disclosed, the system of the invention enables to produce/recover/recycle the required energies to increase the temperature of the raw material containing carbon and the different gaseous flows, and to perform the various reactions, reducing the initial thermal demand from 236.67 kJ to 57.939 kJ per mole of converted $CO_2$ (per one mole of carbon as used to generate electricity) along the following cycles.

In this stage of the process of the invention, 100% of the energy of a mole of carbon (MPC—raw material containing carbon) are transferred to the reaction chain to produce electricity (or thermodynamic energy/water steam) and the $CO_2$ produced by its full oxidation is pure and capturable with no other form of process and the conversion $CO_2$ is recycled.

The second gaseous flow DFG essentially comprising $CO_2$ is therefore almost pure (it may contain dust particles which will be retained by a classical filter). It is separated in two volumes by a registration set at the outlet of the feeding chamber 108 of the oxidation reactor 102. At least 50% are recycled to the system to constitute the gaseous flow of gasification for the next cycle of treatment.

The remaining volume DFG2 is collected "without any process" to be stocked or recycled in various applications. We should highlight that, for each cycle, this volume corresponds to the carbons as contained in the chemical formulation of the carbon material as introduced into the gasification reactor. The chain of reactions, conversions and energy transferences over these carbons only produces pure $CO_2$, and no other process and/or system is useful. This step really eliminates fully all current procedures aiming to the collection of $CO_2$, which will be very expensive.

In this step of the process of the invention, the solution on the negative environmental impact (of traditional facilities for the production of electricity from carbon-containing materials) is provided; in this step of the process of the invention, the thermal balance is unbalanced, with a deficit of 57.939 kJ per mole of converted $CO_2$ per one mole of carbon; in this step of the process of the invention, the chain of reactions has the oxidation energy of two moles of Me as generated in the activation reactor 106 to be transferred to the fluid FGE for conversion into electricity.

In conclusion, the thermal balance is as follows:

the oxidation of the two moles of Me=2 moles of MeO=488.60 kJ less the thermal deficit in the oxidation reactor=57.939 kJ per mole of converted $CO_2$ per one mole of carbon, i.e. a total of:

488.60 kJ–57.939=430.661 kJ per one mole of carbon.

The compensation of said 57.939 kJ of the thermal deficit from process reactions of the invention is assured by:

thermal transference of said 57.939 kJ of the thermal deficit of the overheated flow of air FAA to the gasification reaction by a thermal exchanger located in the gasification reactor 102; and/or a complementary recycling of $CO_2$ (1.15 mole of useful $CO_2$ to the supply of 57.939 kJ), which function will be of heat holder for said energy which is taken from the energy as supplied to the activation reactor 106.

This allows the following relationship: in a current system, the combustion of carbon (carbon-containing raw materials) degrades the power potential (especially for the thermal losses in smokes), wherein said lowering is defined by combustion yield, being the energy residue lowered by the losses related to the exchanges in the generator. The set of these lowerings gives us a total yield over PCS (if there is energy recovery from the condensation of water steam as contained in smokes) or over PCI (the most common data). For an efficient thermal generator, this global yielding is near 85% over PCI.

The maximum yield of conversion in electricity of a current facility is of 35% of PCI, taking into account the whole sum of degradations, from the combustion to the turboalternator, passing through the various exchangers.

The system of the invention also exchanges the heat of the reactions to water steam (electricity generation fluid FGE), which is introduced in the alternator of the turbine for conversion into electricity. If we take the evaporator as a point of reference, as included in both processes, the conventional combustion system and the system of the invention, this point defines the real yield of the conversion into electricity.

For both processes, the same thermal power for the introduced carbons (MPCS), i.e. a PCI 394 kJ/mol of C, is reserved.

In the combustion processes, the global yield in the generator is 85%, i.e. a thermal residue of 335 kJ/mol of C available in the evaporator. In these systems, the yield of conversion in electricity is 35% PCI, i.e.: 394×0.35=138 kJ elect/mole of C; if we make the relationship on the evaporator, the real yield of the conversion in electricity of the available power for this process is therefore: 138×100/335=41%.

The process of the invention makes thermochemical reactions which do not degrade the available power. In the same point of reference, we will then have 430.661 kJ per mole of carbon in reaction as previously defined; the conversion in electricity is then 430.661×41%=176.571 kJ elect., i.e. a gain of 38.571 kJ elect., 27.95% more electricity "for the same quantity of carbon as introduced".

Both processes use a mole of carbon generating a mole of $CO_2$.

In a conventional system, this mole of $CO_2$ is diluted in smokes (in a proportion between 14 and 18% of $CO_2$ per $Nm^3$) and its collection requires important means.

In the system and process of the invention, this same mole of $CO_2$ is not diluted, has a proportion of 98% or more of the exit volume and can be directly collected. This mole of $CO_2$ can be collected for stocking and/or recycling.

FIG. 2 is a schematic representation of a second way of assembly of a system of the invention.

The system 200 represented by FIG. 2 comprises all the elements of the system 100 as represented by FIG. 1.

The system 200 also comprises a bioreactor containing microalgae.

The part DFG2 of the second cooled gaseous flow as obtained at the outlet of the feeding chamber 108 of the gasification reactor 102 is injected into the bioreactor 202. In the alga culture bioreactor 202, carbon dioxide $CO_2$ is used by photosynthesis as performed by microalgae. Photosynthesis produces, on one hand, carbon biomass BC and, on the other hand, a gaseous flow of oxygen $FO_2$ by separating the carbon element <<C>> from the molecule of dioxygen <<$O_2$>>.

The carbon biomass BC as obtained is supplied to a biomass conditioned system 204 which may be:

a system to extract essential oils from microalgae with high content of lipids and feed-pharmaceutical molecules as used in the pharmacopeia and/or hydrocarbons. at the end of that extraction, about 30% of the biomass remain in the form of coal, which may be returned to the gasifier 102;

or e.g. a drying system to be conditioned before its introduction into the gasification reactor 102.

The gaseous flow of oxygen $FO_2$ may be supplied to the system of the invention, e.g. at the level of the gasification reactor 102 to complement gasification of material containing carbon in the reactor 102.

Advantageously, the production of carbon-containing biomass in this second way of embodiment stimulates thermal yield in the reference evaporator, "delivering" 394 kJ (of the element C as recycled in biomass); the conversion into electricity is then 430.661+394=824.661×41%=338.111 kJ electric, i.e. a multiplying coefficient of electricity production "by the same mole of carbon as introduced" of 2.45.

In this example, carbon is oxidized by the molecule of $O_2$, thus again generating a $CO_2$ which is recycled in the same fashion. There is no atmospheric rejection or need for depuration.

The invention is surely not limited to the examples as disclosed.

What is claimed is:

1. A process to produce electricity from raw material containing carbon (C), said process comprising an orderly and continuous repetition of the following steps, which constitute a processing cycle:

gasification in a gasification reactor of dry raw material containing carbon (C) with a gaseous flow of gasification (FGG) comprising $CO_2$ at high temperature, said gasification supplying a first gaseous flow (PFG) comprising molecules of carbon monoxide (CO);

oxidation in an oxidation reactor by oxygen holders in an oxidized state (MeO, wherein Me is a metal), of said molecules of carbon monoxide (CO) present in said first gaseous flow (PFG), and said oxidation supplying a second gaseous flow (DFG) at high temperature comprising $CO_2$ and oxygen holders in a reduced state (Me);

activation in an activation reactor of said oxygen holders in the reduced state (Me) with a gaseous flow of activation (FA), comprising elements of oxygen (O), said oxidation supplying oxygen holders in the oxidized state (MeO) and an oxygen-poor gaseous flow of activation at high temperature (FAA); and conversion of at least a part of the thermal power of said gaseous oxygen-poor flow of activation at high temperature (FAA) to electricity.

2. The process of claim 1, further comprising transfer of a part of the thermal power generated during gasification to the gaseous oxygen-poor flow of activation (FAA) before the step of conversion.

3. The process of claim 1, wherein the conversion comprises transference of at least a part of the thermal power of said gaseous oxygen-poor flow of activation (FAA) to an electricity-generating fluid (FGE) that is supplied to a converter device for the production of electricity.

4. The process of claim 3, further comprising pre-heating of the gaseous flow of activation (FA) with a residual amount of energy from the electricity generating fluid (FGE), before the step of activation.

5. The process of claim 1, further comprising recovery of a residual amount of said thermal power from said gaseous oxygen-poor flow of activation (FAA), wherein at least a part of said residual amount of said thermal power transferred to the gaseous flow of gasification (FGG), which can be used in a next cycle of treatment.

6. The process of claim 1, further comprising a temperature increase of the raw material containing carbon (C) before the gasification by transference of at least a part of the thermal power of the second gaseous flow (DFG) at high temperature to said raw material containing carbon (C).

7. The process of claim 1, further comprising a closed ring recycling of at least a part of the $CO_2$ (DFG1) from the second gaseous flow (DFG) to constitute said gaseous flow of gasification (FGG).

8. The process of claim 7, further comprising supply of a part of the $CO_2$ (DFG2) from the second gaseous flow (DFG) to a bioreactor comprising microalgae, after the refrigeration of said part of the $CO_2$ (DFG2) of said second gaseous flow (DFG), wherein said microalgae photosynthesize the $CO_2$ that is present in said part of the $CO_2$ (DFG2) from said second gaseous flow (DFG), wherein said bioreactor is supplied with a part of a gaseous flow of oxygen and a carbon-containing raw biomass (BC).

9. The process of claim 8, further comprising the recovery and treatment of the carbon-containing raw biomass (BC) as supplied by the bioreactor, wherein said biomass (BC) is considered for gasification in the gasification reactor.

10. The process of claim 8, further comprising the recovery of at least a part of the gaseous flow of oxygen ($FO_2$) generated by said microalgae and injection of at least a part of said gaseous flow of oxygen ($FO_2$) in the gasification reactor to complement the gasification of the raw material containing carbon (C).

* * * * *